United States Patent [19]

Foster

[11] 3,718,222
[45] Feb. 27, 1973

[54] COUPLING FOR DETACHABLE IMPLEMENTS

[76] Inventor: Phillip W. Foster, c/o Lee Blacksmith, Lee, Ill. 60530

[22] Filed: Dec. 11, 1970

[21] Appl. No.: 97,248

[52] U.S. Cl. ................................................214/145
[51] Int. Cl. ................................................E02f 3/70
[58] Field of Search...............214/145, 146, 778, 140

[56] References Cited

UNITED STATES PATENTS 2,781,928   2/1957   McNeice et al. .....................214/778
3,512,665   5/1970   Westendorf..........................214/145

*Primary Examiner*—Gerald M. Forlenza
*Assistant Examiner*—John Mannix
*Attorney*—Wolfe, Hubbard, Leydig, Voit & Osann Ltd.

[57] ABSTRACT

A coupling for detachably connecting a farm implement with a movable boom includes a first part with a frame mountable on the free end of the boom for rotation relative thereto and for bodily movement therewith through a predetermined arc. A pair of spaced apart mounting posts extend outwardly of the edge of the frame and are moved with the latter through that arc to fit within a pair of collars mounted on the back of the implement. Once the posts are inserted into the collars, a pressure fluid cylinder mounted on the boom and connected to the frame is actuated to rotate the latter clockwise drawing the back of the implement against the frame. This aligns a portion of a connector mounted on the frame with a cooperating portion of the connector mountable on the implement. Thereafter, a pin inserted through the connector portions holds the connector together to prevent the posts from being withdrawn from the collars.

1 Claim, 4 Drawing Figures

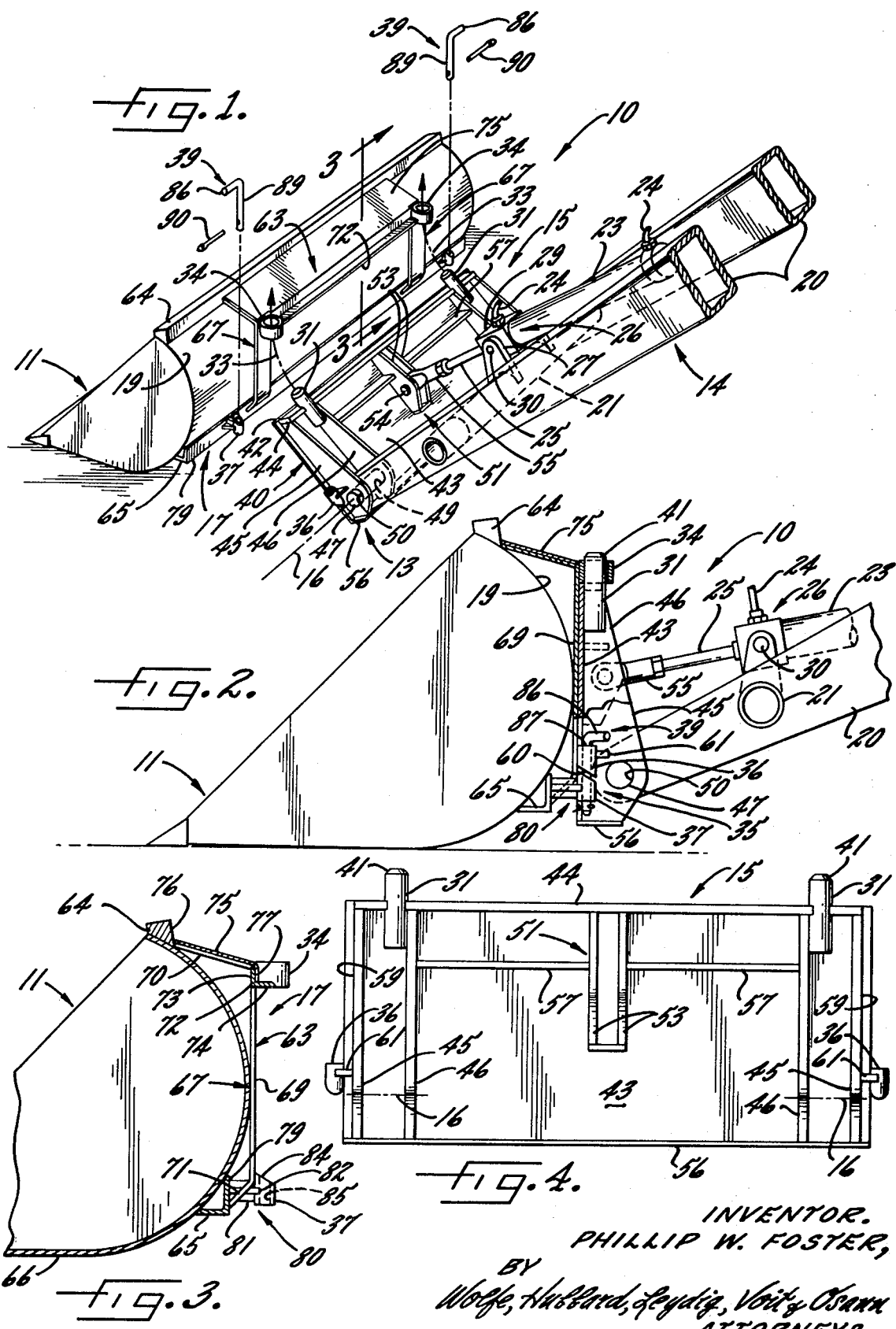

COUPLING FOR DETACHABLE IMPLEMENTS

BACKGROUND OF THE INVENTION

This invention relates to couplings of the type used to mount detachable farm or construction implements on the free end of a movable boom. More particularly, the invention is concerned with the type of coupling which allows the implement to be rotated relative to the end of the boom in addition to connecting the implement for bodily movement with the boom. Previous couplings of this type are generally found to include parts which are mounted both on the boom and the implement and interfit to connect the implement to the boom. Usually several different implements are provided with similar parts of the coupling so that the boom may be attached to any selected implement.

When using previous couplings, the attachment operation is often difficult and time-consuming, the interfitting parts of the couplings requiring precise alignment in order to fit together. This is found to be a difficult project at best, and many times the boom or implement must be jiggled, shoved, lifted, twisted or forced in any other of a number of ways to get the coupling parts aligned to fit together properly. All of this requires time, and, in many instances, the assistance of some other person to help connect the implement to the boom.

SUMMARY OF THE INVENTION

The primary object of the present invention is to overcome the difficulties of prior couplings by providing a new and improved coupling which allows the connection between the implement and the boom to be made much more quickly and with much less effort than was heretofore possible.

Another important object of the present invention is to arrange the parts of the coupling so that they may be easily guided to interfit and, thereafter, automatically align so that they may be easily secured together.

The invention also resides in the novel manner of mounting and arranging the parts of the coupling to provide easy attachment of the implement to the boom.

Other objects and advantages will become apparent from the following detailed description when taken in conjunction with the accompanying drawings.

BRIEF DESCRIPTION OF THE DRAWINGS

FIG. 1 is a perspective view of a coupling, embodying the novel features of the present invention, with parts mounted on a scoop and a boom to be moved together to couple the scoop on the end of the boom.

FIG. 2 is a side view of the coupling showing it being used to couple the scoop to the end of the boom.

FIG. 3 is an enlarged fragmentary sectional view taken substantially along line 3—3 of FIG. 1.

FIG. 4 is an elevational view of the back side of the part of the coupling which is mounted normally on the free end of the boom.

DETAILED DESCRIPTION OF THE PREFERRED EMBODIMENT

As shown in the drawings for purposes of illustration, the invention is embodied in a coupling 10 used to mount a farm implement such as a scoop 11 on the free end 13 of a movable boom 14, the latter being connected at its other end onto a loader or tractor (not shown). Usually such couplings include two separable parts which are mounted on the objects to be connected together, in this case the scoop and boom, and interfit to hold the objects from separating as they are used.

In the present instance, a first part 15 of the coupling 10 is mounted on the boom 14 for rotation about a predetermined axis 16 which extends across the free end 13 generally horizontal with the ground. A second part 17 of the coupling, on the other hand, is mounted on the curved back side 19 of the scoop 11 to couple with the first part and hold the scoop rotatably on the end of the boom. So connected, the scoop may be maneuvered on the free end and with the boom to perform a variety of tasks.

As shown in FIG. 1, the boom 14 includes a pair of spaced arms 20 with a support pipe 21 extending therebetween at a position spaced rearwardly of the free end 13. The pipe carrys a pressure actuated cylinder 23 including a piston (not shown) which is reciprocated by alternately applied pressure through hoses 24 located at each end of the cylinder. A rod 25 connected to the piston and extending forwardly of the cylinder connects with the first part 15 of the coupling to rotate the latter about the axis 16 as the piston is reciprocated. Because the end of the rod moves up and down slightly with respect to the arms as the piston is reciprocated, the cylinder is mounted at one end 26 to pivot on the pipe. For this purpose, a pair of spaced wing brackets 27 project outwardly of the pipe to fit against the sides of a mounting block 29 fixed on the one end of the cylinder. A pin 30 extending into the block through each bracket allows the cylinder to pivot relative to the pipe as the piston reciprocates to rotate the first part of the coupling.

In accordance with the present invention, the first and second parts 15 and 17 of the coupling 10 are constructed and interfit in a novel manner so as to greatly simplify the operation of connecting the scoop 11 to the boom 14. For this purpose, the first part 15 includes at least one mounting post 31 extending outwardly thereof radially of the axis 16 such that, as the free end 13 of the boom is swung through a predetermined arc 33, the post mates with a collar 34 mounted on the back side 19 of the scoop to couple the two parts together. Thus connected, the collar rests on the first part around the mounting post to prevent the scoop from moving longitudinally or laterally with respect to the first part as the latter in conjunction with the collar constitutes the load bearing portion of the coupling. Once the post has been inserted into the collar, continued movement of the boom along the arc picks the scoop off the ground so that the first part can be rotated about the axis to draw the second part against the first part in a final coupling position as illustrated in FIG. 2. To hold the two parts together in this position, the coupling also includes at least one connector 35 having a first portion 36 thereof mounted on the first part and a second portion 37 mounted on the second part to automatically align with the first portion as parts are brought into the final coupling position. Once the portions of the connector are aligned, a pin 39 inserted therethrough holds the parts of the coupling from separating. Thus, with this arrangement, a new and easier-to-use coupling is provided whereby one individual can easily and swiftly mount the scoop on the end of the boom by simple mechanical manipulation of the latter. Preferably, two laterally spaced mounting posts and connectors are used in the coupling.

In the present instance, the first part 15 of the coupling 10 includes a frame 40 with the two mounting posts 31 carried thereby in positions spaced from each other to give stability to the coupling. Preferably, the posts are cylindrical in shape with a tapered end portion 41 so that the posts may be guided easily into the collars during the coupling operation. As shown in FIGS. 1 and 2, the frame is mounted on the free ends 13 of the boom 14 for rotation about the axis 16 and includes a generally rectangular plate 43 which is adapted to brace against the second part and coact therewith to carry the scoop 11 when the parts 15 and 17 are coupled. The posts are welded to the back of the plate and extend outwardly thereof through a rectangular carrier shelf 44 mounted along the top edge 42 of the plate. The shelf extends rearwardly normal to the plate and is adapted to engage a portion of the second part to help carry the scoop in addition to providing support for the frame.

Extending rearwardly of the plate 43 adjacent each end thereof is a pair of spaced triangular braces 45 and 46 which are welded parallel with the end edge to project normally of the plane of the plate. Each of the free ends 13 of the boom 14 fits and is held between one of the pairs of braces by a shaft 47 extending along the axis through an opening 49 in the end of each arm and holes 50 punched in the lower ends of each brace to rotatably mount the frame 40 on the end of the boom.

Mounted in the center portion of the back of the plate 43 is a channel bracket or holder 51 adapted to receive the rod 25 which provides the means for rotating the frame 40. The bracket includes a pair of spaced walls 53 extending normally of the plate lengthwise radially of the axis 16. The forward end of the rod is received and held between the walls by a pin 54 extending through both the walls and an eye coupling 55 threaded on the end of the rod. Thus, the end of the rod is rotatably connected with the plate such that, when the rod reciprocates with the piston, the plate rotates.

Welded along the bottom of the plate 43 is a lower shelf 56 which gives support to the frame 40 and helps prevent it from twisting or bending when heavy loads are carried in the scoop 11. The front edge of the shelf 56 integrally formed with or welded to the lower edge of the plate and extends the entire length of the latter for maximum support. Further support is given by a rectangular stay 57 mounted edgewise normal to the plate generally parallel with the axis 16 and extending between each of the channel bracket walls 53 and the adjacent or inner brace 46. Each stay is welded along its forward edge to the back of the plate, at one of its ends to the inner brace and at the other end to the bracket wall, thus providing support not only for the plate, but also for the channel bracket 51.

On an outer wall 59 of each outside brace 45 is mounted the first portion 36 of each of the connectors 35. As is shown best in FIG. 2, the first portion resembles a small metal tube with a diagonally sliced lower end portion leaving a forwardly inclined lower end surface 60. The slanted surface helps to align the connector portions as the first and second parts 15 and 17 of the coupling 10 are interfitted by engagement with a corresponding surface on the second portion 37. To mount each first portion on the outer walls, a flange 61 is welded to the wall and the first portion to space the latter outwardly of the wall in a fixed position relative to the mounting posts 31.

As shown in FIGS. 1–3, the second part 17 includes a framework 63 welded to the back side 19 of the scoop 11, the two collars 34 which are mounted on the framework and the two second portions 37 which are also mounted on the framework. More specifically, the latter includes an elongated upper brace 64 which is welded lengthwise along the top edge of the scoop and a lower brace 65 spaced upwardly of the bottom 66 of the scoop and extending lengthwise along the back side thereof.

Two metal straps 67 are connected to the upper and lower braces 64 and 56 and are spaced from each other a distance equal to the distance separating the mounting posts 31. Each of the straps includes a straight portion 69 extending tangentially across the back side 19 of the scoop 11 and forwardly angled upper and lower end portions 70 and 71 which connect, respectively, with the upper and lower braces as shown in FIG. 3. At the point of tangency, each of the straps is welded to the back side of the scoop providing additional support and rigidity to the framework.

Mounted on each of the straps 67 is the generally cylindrical collar 34 which is sized to receive the mounting posts 31 as the parts 15 and 17 of the coupling 11 are connected together. Each of the collars is welded to one of the straps so that the top (FIG. 3) of the collar is flush with the upper end 68 of the straight portion 69. The collars extend rearwardly of the framework and are separated a distance equal to the distance separating the mounting posts by an angle iron support member 72. The outer ends of the latter are welded to the edges of the straps in addition to being welded to the sides of the collars. Thus, an upstanding leg 73 of the member provides sideways support for the straps while a rearwardly extending leg 74 provides sideways support for the collars.

Extending across the angled upper end portion 70 of each of the straps 67 and covering the space therebetween is a rectangular guard plate 75. The forward edge of the guard plate abuts the rear wall 76 of the upper brace 64 while the rearward end is provided with a flange 77 that is bent downwardly to fit between the collars 34 covering the rearward surface of the upstanding leg 73 of the angle iron support member 71 (see FIG. 3). Thus, the guard plate covers the area between the straps to prevent material from falling and lodging between the plate 40 of the first coupling part 15 and the back side 19 of the scoop 11.

Spaced to the outside of each of the lower end portions 71 of the straps 67 and mounted on the back surface 79 of the lower brace 65 is the second portion 37 of each of the connectors 35. The second portions are similar in construction to the first portions 36 and are welded lengthwise across the width of the lower brace on the rearward end of a bracket 80 formed by a rectangular tab 81 welded across the lower brace and a pair of triangular webs 82 braced on either side of the tab. The rearward end of the bracket is cup-shaped to receive the rounded front side of the connector portion. The upper end of the second portion is inclined forwardly so that an upper surface 84 (FIG. 3) faces rearwardly to engage with the inclined surface 60 of the first connector portion 36 and prevent the connector 35 from being pushed forwardly out of alignment as the first and second parts 15 and 17 are coupled together.

To hold the parts 15 and 17 together, both connector portions 36 and 37 include longitudinal holes 85 which are automatically aligned with each other as the plate 40 engages the back side 19 of the scoop 11. Once aligned, the L-shaped connector pin 39 can be inserted through the holes to prevent the scoop from falling off the mounting posts 31. As shown in FIGS. 1 and 2, one leg 86 of the pin seats against an upper edge 87 of the first connector portions 34 while the other leg 89 extends completely through both of the aligned connector portions. The pin is held in this position by a cotter pin 90 which is stuck through a small hole in the pin 39 after the latter is inserted through the connector portions.

To mount the scope 11 on the free end 13 of the boom 14 using the coupling 10 of the present invention, the boom is moved into a position behind the scoop with the mounting posts 31 generally aligned with the collars 34. Then as the end of the boom is swung through the arc 33, the mounting posts guided by the tapered ends 41 slide into the collars to couple with the second part 17 of the coupling. Continued movement through the arc seats the top edge 42 of the plate 40 and the upper shelf 44 against the bottom of the collars and the under side of the support member 63 to act as the load bearing portion of the coupling as shown in FIG. 2. Thus, the second part of the coupling is in engagement with the upper edge of the plate substantially along the length of the latter.

Once the plate 40 and upper shelf 44 have been properly seated, the air cylinder 23 can be activated to reciprocate the piston and draw the rod 25 rearwardly thereby rotating the plate clockwise and pulling the back side 19 of the scoop toward the plate. The rearwardly movement of the scoop is limited as the straps 67 set against the plate to align the connector portions 36 and 37 with each other. Thereafter, it is a simple matter to drop the pin 39 through the connector portions to hold them from being pulled apart. Thus it is seen, with the connector pins in place and the mounting posts inserted into the collars, the scoop is simply and securely mounted on the end of the boom.

I claim as my invention:

1. A coupling for use in attaching a movable boom to the back side of an implement, said coupling comprising a generally rectangular plate member mounted along a horizontal axis extending transversely of the free end of said boom and including an unobstructed front side facing away from the free end of the boom and extending parallel with said axis and a top edge spaced radially from said horizontal axis, said plate being pivotable about said axis and movable bodily with said boom through a predetermined arc to abut the back side of said implement with said front side, two mounting posts rigidly connected with the plate at positions spaced from each other a predetermined distance and projecting upwardly beyond said top edge of said plate, a framework including a pair of laterally spaced narrow plate means for abutment with said first mentioned plate fixed on the back side of the scoop and including further a collar mounted at the top of each narrow plate means with the latter being between the collar and the implement, said collars being spaced from each other a distance equal to the distance between said posts and positioned to receive said posts as the plate member is swung through said arc upwardly and into abutment with the narrow plate means on the back side of the implement thereby to couple the implement on the end of the boom, a pair of releasable connectors with first portions fixed adjacent opposite ends of the lower portion of said plate member and offset laterally and outwardly from each side of the boom and second portions fixed on said framework laterally and outwardly of the boom in positions to align with said first portions when the implement is coupled with the boom, and means for fastening the aligned portions of said connectors together to hold the front side of the plate in abutment with the narrow laterally spaced plates of the framework on the back side of the implement whereby said horizontal axis about which said plate pivots, is positioned closely adjacent the back side of the implement.

* * * * *